US010020535B2

(12) United States Patent
Sato et al.

(10) Patent No.: US 10,020,535 B2
(45) Date of Patent: Jul. 10, 2018

(54) METHOD FOR PRODUCING SULFIDE SOLID ELECTROLYTE

(71) Applicants: IDEMITSU KOSAN CO., LTD., Tokyo (JP); TOYOTA JIDOSHA KABUSHIKI KAISHA, Aichi (JP)

(72) Inventors: Atsushi Sato, Ichihara (JP); Takayoshi Kambara, Chiba (JP); Takumi Tanaka, Sunto-gun (JP); Hirokazu Kawaoka, Nisshin (JP); Takuo Yanagi, Toyota (JP); Takayoshi Doi, Toyota (JP); Takayuki Uchiyama, Susono (JP); Shigenori Hama, Sunto-gun (JP)

(73) Assignees: IDEMITSU KOSAN CO., LTD., Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/366,220

(22) Filed: Dec. 1, 2016

(65) Prior Publication Data
US 2017/0155170 A1 Jun. 1, 2017

(30) Foreign Application Priority Data

Dec. 1, 2015 (JP) ................................ 2015-234848

(51) Int. Cl.
H01M 10/0562 (2010.01)
C03B 32/02 (2006.01)
C03C 1/00 (2006.01)
C03C 3/32 (2006.01)
C03C 4/14 (2006.01)
C03C 4/18 (2006.01)
C03C 10/00 (2006.01)
H01M 10/0525 (2010.01)
H01M 10/052 (2010.01)
C03C 10/16 (2006.01)

(52) U.S. Cl.
CPC ......... H01M 10/0562 (2013.01); C03B 32/02 (2013.01); C03C 1/006 (2013.01); C03C 3/323 (2013.01); C03C 4/14 (2013.01); C03C 4/18 (2013.01); C03C 10/00 (2013.01); C03C 10/16 (2013.01); H01M 10/052 (2013.01); H01M 10/0525 (2013.01); C03B 2201/86 (2013.01); C03C 2204/00 (2013.01); H01M 2220/30 (2013.01); H01M 2300/0068 (2013.01)

(58) Field of Classification Search
CPC ..... H01M 10/0562; H01M 2300/0065; H01M 2300/0068; C03B 32/02; C03B 2201/86; C03C 1/006; C03C 3/323; C03C 4/14; C03C 4/18; C03C 10/16; C03C 10/10; C03C 2204/00
See application file for complete search history.

(56) References Cited

U.S. PATENT DOCUMENTS

| 5,958,281 A | 9/1999 | Takada et al. |
| 8,470,476 B2 | 6/2013 | Yamamoto et al. |
| 8,518,585 B2 | 8/2013 | Ota et al. |
| 9,806,373 B2* | 10/2017 | Kambara .......... H01M 10/0562 |
| 2010/0200795 A1 | 8/2010 | Ota et al. |
| 2010/0285368 A1 | 11/2010 | Yamamoto et al. |
| 2014/0295260 A1* | 10/2014 | Sugiura ............. H01M 10/0562 429/189 |
| 2015/0349377 A1 | 12/2015 | Sugiura et al. |
| 2016/0104916 A1* | 4/2016 | Seino ...................... C01B 17/22 429/189 |
| 2016/0149259 A1 | 5/2016 | Osada et al. |
| 2016/0190638 A1 | 6/2016 | Sugiura et al. |

FOREIGN PATENT DOCUMENTS

| JP | H07330312 A | 12/1995 |
| JP | H09283156 A | 10/1997 |
| JP | H111134937 A | 5/1999 |
| JP | 2004348972 A | 12/2004 |
| JP | 2004348973 A | 12/2004 |
| JP | 2009110920 A | 5/2009 |
| JP | 2010030889 A | 2/2010 |
| JP | 201090003 A | 4/2010 |
| JP | 2010140893 A | 6/2010 |
| JP | 2010163356 A | 7/2010 |
| JP | 2010262860 A | 11/2010 |
| JP | 2011084438 A | 4/2011 |
| JP | 2014127388 A | 7/2014 |
| JP | 2015056333 A | 3/2015 |
| JP | 2015125932 A | 7/2015 |
| WO | 2004093099 A1 | 10/2004 |
| WO | 2009047977 A1 | 4/2009 |

(Continued)

OTHER PUBLICATIONS

Machine translation of JP 2015-125932, published on Jul. 6, 2015 (Year: 2015).*
Kanno, Ryoji et al., "Lithium Ionic Conductor Thio-LISICON: The Li2S GeS2 P2S5 System," Journal of the Electrochemical Society, 2001, vol. 148, No. 7, pp. A742-A746.
English Abstract of JP2009110920, Publication Date: May 21, 2009.
English Abstract of JP2010163356, Publication Date: Jul. 29, 2010.
English Abstract of JP2004348973, Publication Date: Dec. 9, 2004.
English Abstract of WO2004093099, Publication Date: Oct. 28, 2004.
English Abstract of JP2010030889, Publication Date: Feb. 12, 2010.
English Abstract of JP2010090003, Publication Date: Apr. 22, 2010.
English Abstract of JPH11134937, Publication Date: May 21, 1999.

(Continued)

*Primary Examiner* — Anca Eoff
(74) *Attorney, Agent, or Firm* — Millen White Zelano and Branigan, PC; Csaba Henter

(57) ABSTRACT

A method for producing a sulfide glass ceramic, including reacting a lithium compound, a phosphorus compound and a halogen compound in a solvent that contains a hydrocarbon and an ether compound to produce a sulfide glass that contains a Li element, a P element, a S element and one or more halogen elements, and heating the sulfide glass to produce a sulfide glass ceramic.

20 Claims, No Drawings

(56) References Cited

FOREIGN PATENT DOCUMENTS

| WO | WO 2013/073035 | * | 5/2013 |
| WO | WO 2014/174829 | * | 10/2013 |
| WO | WO 2014/102580 | * | 7/2014 |
| WO | 2014208239 A1 | | 12/2014 |

OTHER PUBLICATIONS

English Abstract of JPH07330312, Publication Date: Dec. 19, 1995.
English Abstract of JP2004348972, Publication Date: Dec. 9, 2004.
English Abstract of JP-2015-125932, Publication Date: Jul. 6, 2015.

* cited by examiner

METHOD FOR PRODUCING SULFIDE SOLID ELECTROLYTE

FIELD OF THE INVENTION

The present invention relates to a method for producing a sulfide solid electrolyte.

BACKGROUND OF THE INVENTION

With rapid spread of information-related instruments, communication instruments and others such as personal computers, video cameras, cell phones and the like in recent years, development of batteries that are utilized as power sources for them is considered to be important. Among such batteries, lithium batteries are specifically noted from the viewpoint of realizing a high energy density.

Lithium batteries that are now on market use an electrolytic solution containing a combustible organic solvent, and therefore it is necessary to fit a safety device for preventing temperature elevation in short circuit and to make improvement in point of configurations and materials for prevention of short circuit. As opposed to this, a lithium battery in which the electrolytic solution is changed to a solid electrolyte layer so that the battery is solid as a whole is considered to be excellent in production cost reduction and productivity since a combustible organic solvent is not used in the battery and the safety device to be therein can be simplified.

As a solid electrolyte for use in such a solid electrolyte layer, for example, there are known sulfide solid electrolytes to be produced using lithium sulfide, diphosphorus pentasulfide, lithium iodide and lithium bromide as starting materials (for example, PTL 1).

As a method for producing the sulfide solid electrolyte using lithium sulfide, diphosphorus pentasulfide and others as starting materials, for example, a method of using a hydrocarbon solvent is proposed in PTLs 2 and 3.

In PTL 4, there is disclosed a method of preventing adhesion and granulation of a sulfide solid electrolyte before formation of fine particles by grinding mixture of a sulfide solid electrolyte that contains a sulfide and one or more halides, an ether compound and a solvent.

On the other hand, in a production method for a sulfide solid electrolyte using an organic solvent, it is known that the organic solvent having remained, if any, in the resultant sulfide solid electrolyte may cause reduction in Li ionic conductivity and therefore such a residual solvent must be reduced (for example, PTL 5).

CITATION LIST

Patent Literature

PTL 1: WO2014/208239
PTL 2: WO2009/047977
PTL 3: JP-A2009-110920
PTL 4: JP-A 2015-56333
PTL 5: JP-A2014-127388

SUMMARY OF THE INVENTION

Technical Problem

In the case where a hydrocarbon solvent is used as in PTLs 2 and 3, it may be often insufficient to reduce the amount of the residual solvent to be contained in the resultant sulfide solid electrolyte, as the case may be and depending on conditions.

The present inventors have made in consideration of these situations, and an object thereof is to provide a method for producing a sulfide solid electrolyte using a solvent, the sulfide solid electrolyte containing a Li element, a P element, a S element and one or more halogen elements with a reduced solvent content.

Solution to Problem

The present invention has made assiduous studies for the purpose of solving the above-mentioned problems and, as a result, have found that the above-mentioned problems can be solved by using a solvent that contains a hydrocarbon and an ether compound.

The present invention has been completed on the basis of this finding.

Specifically, the present invention provides the following [1] to [19].

[1] A method for producing a sulfide glass ceramic, including reacting a lithium compound, a phosphorus compound and a halogen compound in a solvent that contains a hydrocarbon and an ether compound to produce a sulfide glass that contains a Li element, a P element, a S element and one or more halogen elements, and heating the sulfide glass to produce a sulfide glass ceramic.

[2] The method for producing a sulfide glass ceramic according to the above [1], wherein the lithium compound is lithium sulfide.

[3] The method for producing a sulfide glass ceramic according to the above [1] or [2], wherein the phosphorus compound is diphosphorus pentasulfide.

[4] The method for producing a sulfide glass ceramic according to any of the above [1] to [3], wherein the halogen compound is at least one of lithium iodide and lithium bromide.

[5] The method for producing a sulfide glass ceramic according to the above [3] or [4], wherein the proportion of the lithium sulfide to the total of the lithium sulfide and the diphosphorus pentasufide is from 68 mol % to 82 mol %.

[6] The method for producing a sulfide glass ceramic according to the above [4], wherein, when lithium iodide and lithium bromide are used as starting materials, the proportion of the lithium bromide to the total of the lithium iodide and the lithium bromide is from 1 mol % to 99 mol %.

[7] The method for producing a sulfide glass ceramic according to any of the above [1] to [6], wherein the heating includes a first heating of heating the sulfide glass at a temperature of 100° C. or higher and lower than the crystallization temperature (Tc) of the crystalline structure that the sulfide glass ceramic to be obtained has, and after the first heating, a second heating of further heating the sulfide glass ceramic at a temperature of not lower than crystallization temperature (Tc) and up to the crystallization temperature (Tc)+60° C.

[8] The method for producing a sulfide glass ceramic according to any of the above [1] to [6], wherein the heating includes a first heating of heating the sulfide glass at a temperature of 100° C. or higher and 140° C. or lower, and after the first heating, a second heating of further heating at a temperature of 150° C. or higher and 300° C. or lower.

[9] The method for producing a sulfide glass ceramic according to the above [8], wherein the first heating is at a temperature of 120° C. or higher and 140° C. or lower, and the second heating is at a temperature of 170° C. or higher and 280° C. or lower.

[10] The method for producing a sulfide glass ceramic according to any of the above [7] to [9], wherein the heat treatment time in the first heating is 1 minute or more and 10 hours or less, and the heat treatment time in the second heating is 1 minute or more and 10 hours or less.

[11] The method for producing a sulfide glass ceramic according to any of the above [7] to [9], wherein the heat treatment time in the first heating is 30 minutes or more and 10 hours or less, and the heat treatment time in the second heating is 30 minutes or more and 10 hours or less.

[12] The method for producing a sulfide glass ceramic according to any of the above [7] to [11], wherein the first heating is carried out under such a condition that the sulfide glass becomes a sulfide glass ceramic having a degree of crystallization of 1% or more and 50% or less, and the second heating is carried out under such a condition that the degree of crystallization of the sulfide glass ceramic obtained in the first heating is further increased.

[13] The method for producing a sulfide glass ceramic according to any of the above [1] to [12], wherein the hydrocarbon is an aromatic hydrocarbon.

[14] The method for producing a sulfide glass ceramic according to the above [13], wherein the aromatic hydrocarbon is toluene.

[15] The method for producing a sulfide glass ceramic according to any of the above [1] to [14], wherein the ether compound is a linear ether.

[16] The method for producing a sulfide glass ceramic according to the above [15], wherein the linear ether is dibutyl ether.

[17] The method for producing a sulfide glass ceramic according to any of the above [1] to [16], wherein the amount of the ether compound added is from 0.01% by weight to 100% by weight relative to the total amount of the starting materials.

[18] The method for producing a sulfide glass ceramic according to any of the above [1] to [17], wherein the blending ratio of the hydrocarbon to the ether compound is from 480/1 to 50/1 by volume ratio.

[19] A method for producing a sulfide solid electrolyte that contains a Li element, a P element, a S element and one or more halogen elements, the method including reacting a lithium compound, a phosphorus compound and a halogen compound in a solvent containing a hydrocarbon and an ether compound.

Advantageous Effects of Invention

According to the present invention, there can be provided a production method for a sulfide solid electrolyte that contains a Li element, a P element, a S element and one or more elements and has a reduced solvent content.

DETAILED DESCRIPTION OF THE INVENTION

In this description, the numerical values in "or more", "or less" or "X to XX" relating to a numerical range can be combined in any arbitrary manner.

The sulfide solid electrolyte to be obtained according to the present invention includes a sulfide glass and a sulfide glass ceramic, but is preferably a sulfide glass ceramic.

Here, "sulfide glass" is a sulfide solid electrolyte whose X-ray diffraction pattern in X-ray diffractometry is a halo pattern which does not substantially show any other peak than solid electrolyte materials-derived peaks. The pattern is irrespective of presence or absence of solid electrolyte materials-derived peaks therein. "Sulfide glass ceramic" is a sulfide solid electrolyte whose X-ray pattern in X-ray diffractometry shows a peak derived from the crystal structure of the sulfide solid electrolyte. The pattern is irrespective of presence or absence of solid electrolyte materials-derived peaks therein. In other words, the sulfide glass ceramic contains a sulfide solid electrolyte-derived crystal structure, and a part thereof may be a sulfide solid electrolyte-derived crystal structure or all may be a sulfide solid electrolyte-derived crystal structure.

The sulfide glass ceramic may be obtained, for example, by crystallizing the sulfide glass.

The sulfide solid electrolyte to be obtained according to the production method for a sulfide solid electrolyte of the present invention contains a Li element, a P element, a S element and one or more halogen elements. The kinds of the elements constituting the sulfide solid electrolyte can be confirmed, for example, using an ICP emission analyzer.

Examples of the crystal structure of the sulfide solid electrolyte to be obtained in the present invention include a $Li_3PS_4$ crystal structure, a $Li_4P_2S_6$ crystal structure, a $Li_7PS_6$ crystal structure, a $Li_7P_3S_{11}$ crystal structure, a $Li_{4-x}Ge_{1-x}P_xS_4$-type thio-LISICON Region II-type crystal structure (see Kanno et al., Journal of The Electrochemical Society, 148 (7) A742-746 (2001)), a crystal structure similar to the $Li_{4-x}Ge_{1-x}P_xS_4$-type thio-LISICON Region II-type crystal structure (see Solid State Ionics 177 (2006) 2721-2725), etc.

In X-ray diffractometry using a CuKα ray, the diffraction peaks of the $Li_3PS_4$ crystal structure appear, for example, at around 2θ=17.5°, 18.3°, 26.1°, 27.3° and 30.0°, the diffraction peaks of the $Li_4P_2S_6$ crystal structure appear, for example, at around 2θ=16.9°, 27.1° and 32.5°, the diffraction peaks of the $Li_7PS_6$ crystal structure appear, for example, at around 2θ=15.3°, 25.2°, 29.6° and 31.0°, the diffraction peaks of the $Li_7P_3S_{11}$ crystal structure appear, for example, at around 2θ=17.8°, 18.5°, 19.7°, 21.8°, 23.7°, 25.9°, 29.6° and 30.0°, the diffraction peaks of the $Li_{4-x}Ge_{1-x}P_xS_4$-type thio-LISICON Region II-type crystal structure appear, for example, at around 2θ=20.1°, 23.9° and 29.5°, the diffraction peaks of the crystal structure similar to the $Li_{4-x}Ge_{1-x}P_xS_4$-type thio-LISICON Region II-type crystal structure appear, for example, at around 2θ=20.2 and 23.6°.

The sulfide solid electrolyte to be obtained according to the present invention preferably has peaks at 2θ=20.2° and 23.6° in X-ray diffractometry using a CuKα ray. Specifically, it preferably has a crystal structure similar to the $Li_{4-x}Ge_{1-x}P_xS_4$-type thio-LISICON Region II-type crystal structure. This crystal phase may be referred to as a high Li-ion conductive phase. Here, the peak at 2θ=20.2° includes not only a strict peak at 2θ=20.2° but also peaks falling within a range of 2θ=20.2°±0.5°. Depending on the condition of crystal, there is a possibility that the peak position may move in some degree, and therefore the position is defined as above. Similarly, the peak at 2θ=23.6° includes not only a strict peak at 2θ=23.6° but also peaks falling within a range of 2θ=23.6°±0.5°. The high Li-ion conductive phase has peaks at 2θ=20.2° and 23.6° and, in addition thereto, generally has peaks at 2θ=29.4°, 37.8°, 41.1° and 47.0°. These peak positions may also move with a range of ±0.5°. In particular, the sulfide solid electrolyte preferably has peaks of a high Li-ion conductive phase alone, that is, preferably has a high Li-ion conductive phase as a single phase. This is because the sulfide solid electrolyte of the type can be a sulfide solid electrolyte having a high Li ion conductivity.

The production method for the sulfide solid electrolyte of the present invention is described in detail hereinunder.

The method for producing a sulfide solid electrolyte containing a Li element, a P element, a S element and one or more halogen elements of the present invention includes (a step) of reacting a lithium compound, a phosphorus compound and a halogen compound in a solvent that contains a hydrocarbon and an ether compound.

Here, each step in the present invention may include any other step than those to be explained in this description, and does not exclude them.

The starting materials for use in the present invention are not specifically limited so far as they include a lithium compound, a phosphorus compound and a halogen compound.

Examples of the lithium compound include lithium sulfide ($Li_2S$), lithium oxide ($Li_2O$), lithium carbonate ($Li_2CO_3$), etc., and above all, lithium sulfide ($Li_2S$) is preferred. The lithium compound may include a lithium metal elemental substance.

The lithium sulfide may be used with no specific limitation, but a high-purity one is preferred. Lithium sulfide may be produced according to the method described in JP-A 7-330312, JP-A 9-283156, JP-A 2010-163356 or JP-A 2011-084438.

Specifically, lithium sulfide may be produced by reacting lithium hydroxide and hydrogen sulfide in a hydrocarbon-type organic solvent at 70° C. to 300° C. to form lithium hydrosulfide, and then dehydrosulfidating the reaction liquid to synthesize lithium sulfide (JP-A 2010-163356).

On the other hand, lithium sulfide may be produced by reacting lithium hydroxide and hydrogen sulfide in a water solvent at 10° C. to 100° C. to form lithium hydrosulfide, and then dehydrosulfidating the reaction liquid to synthesize lithium sulfide (JP-A 2011-084438).

Examples of the phosphorus compound include phosphorus sulfides such s diphosphorus trisulfide ($P_2S_3$), diphosphorus pentasulfide ($P_2S_5$), etc., and sodium phosphate ($Na_3PO_4$), lithium phosphate ($Li_3PO_4$), etc. Above all, phosphorus sulfides are preferred, and diphosphorus pentasulfide ($P_2S_5$) is more preferred. The phosphorus compound may include a phosphorus elemental substance. Phosphorus compounds such as diphosphorus pentasulfide ($P_2S_5$) and the like may be produced industrially, and any commercial one can be used with no specific limitation.

Regarding the combination of a lithium compound and a phosphorus compound, preferably, at least one of the lithium compound and the phosphorus compound contains a sulfur element. Above all, a combination of a lithium compound and a phosphorus sulfide is more preferred, and a combination of lithium sulfide and a phosphorus sulfide is even more preferred.

The halogen compound includes an iodine compound, a fluorine compound, a chlorine compound and a bromine compound. Preferably, at least one of an iodine compound and a bromine compound is used as the halogen compound. More preferably, an iodine compound and a bromine compound are used as the halogen compound.

The halogen element contained in the halogen compound includes an iodine element, a fluorine element, a chlorine element and a bromine element.

Examples of the halogen compound include sodium halides such as NaI, NaF, NaCl, NaBr, etc.; lithium halides such as LiF, LiCl, LiBr, LiI, etc.; boron halides such as $BCl_3$, $BBr_3$, $BI_3$, etc.; aluminum halides such as $AlF_3$, $AlBr_3$, $AlI_3$, $AlCl_3$, etc.; silicon halides such as $SiF_4$, $SiCl_4$, $SiCl_3$, $Si_2Cl_6$, $SiBr_4$, $SiBrCl_3$, $SiBr_2Cl_2$, $SiI_4$, etc.; phosphorus halides such as $PF_3$, $PF_5$, $PCl_3$, $PCl_5$, $POCl_3$, $PBr_3$, $POBr_3$, $PI_3$, $P_2Cl_4$, $P_2I_4$, etc.; sulfur halides such as $SF_2$, $SF_4$, $SF_6$, $S_2F_{10}$, $SCl_2$, $S_2Cl_2$, $S_2Br_2$, etc.; germanium halides such as $GeF_4$, $GeCl_4$, $GeBr_4$, $GeI_4$, $GeF_2$, $GeCl_2$, $GeBr_2$, $GeI_2$, etc.; arsenic halides such as $AsF_3$, $AsCl_3$, $AsBr_3$, $AsI_3$, $AsF_5$, etc.; selenium halides such as $SeF_4$, $SeF_6$, $SeCl_2$, $SeCl_4$, $Se_2Br_2$, $SeBr_4$, etc.; tin halides such as $SnF_4$, $SnCl_4$, $SnBr_4$, $SnI_4$, $SnF_2$, $SnCl_2$, $SnBr_2$, $SnI_2$, etc.; antimony halides such as $SbF_3$, $SbCl_3$, $SbBr_3$, $SbI_3$, $SbF_5$, $SbCl_5$, etc.; tellurium halides such as $TeF_4$, $Te_2F_{10}$, $TeF_6$, $TeCl_2$, $TeCl_4$, $TeBr_2$, $TeBr_4$, $TeI_4$, etc.; lead halides such as $PbF_4$, $PbCl_4$, $PbF_2$, $PbCl_2$, $PbBr_2$, $PbI_2$, etc.; bismuth halides such as $BiF_3$, $BiCl_3$, $BiBr_3$, $BiI_3$, etc.

Above all, lithium halides such as lithium chloride (LiCl), lithium bromide (LiBr), lithium iodide (LiI), etc., as well as phosphorus halides such as phosphorus pentachloride ($PCl_5$), phosphorus trichloride ($PCl_3$), phosphorus pentabromide ($PBr_5$), phosphorus tribromide ($PBr_3$) and others are preferably mentioned. Above all, lithium halides such as lithium chloride (LiCl), lithium bromide (LiBr), lithium iodide (LiI), etc., and phosphorus tribromide ($PBr_3$) are preferred; lithium halides such as lithium chloride (LiCl), lithium bromide (LiBr), lithium iodide (LiI) and others are more preferred; and in particular, at least one of lithium bromide (LiBr) and lithium iodide (LiI) is preferred.

As the halogen compound, one kind of the above-mentioned compounds may be used, or two or more kinds thereof may be used as combined. Specifically, at least one of the above-mentioned compounds may be used. In this case, as the halogen element, one kind among the above-mentioned halogen elements may be used, or two or more kinds thereof may be used as combined.

The proportion of each starting material in all the starting materials is not specifically limited. For example, in the case where $Li_2S$ and $P_2S_5$ are used as the starting materials, the proportion of $Li_2S$ to the total of $Li_2S$ and $P_2S_5$ preferably falls within a range of 68 mol % to 82 mol %, more preferably within a range of 72 mol % to 78 mol %, even more preferably within a range of 74 mol % to 76 mol %. This is because, by employing a composition in the vicinity of the ortho composition to be mentioned below, a sulfide solid electrolyte having high chemical stability can be realized.

In the case where LiI and LiBr are used as the starting materials, the total proportion of LiI and LiBr in all the starting materials is not specifically limited so far as it is a proportion that may produce a desired sulfide solid electrolyte, but is, for example, preferably within a range of 5 mol % to 40 mol %, more preferably within a range of 10 mol % to 35 mol %, even more preferably within a range of 15 mol % to 30 mol %.

The proportion of LiBr to the total of LiI and LiBr (LiBr/LiI+LiBr) is not specifically limited, and may be any arbitrary proportion. The proportion of LiBr is, though not specifically limited, preferably such a proportion that can realize an Li ion conductivity on the same level or more relative to the sulfide solid electrolyte produced in the same manner as above except that LiBr is used in place of LiI in the composition thereof (sulfide solid electrolyte as a control), and is more preferably such a proportion that can realize an Li ion conductivity higher than that of the sulfide solid electrolyte as a control. The proportion of LiBr is, for example, within a range of 1 mol % to 99 mol %, preferably within a range of 5 mol % to 95 mol %, more preferably within a range of 10 mol % to 90 mol %, even more preferably within a range of 20 mol % to 80 mol %. For example, the proportion is from 30 mol % to 75 mol %, or from 40 mol % to 75 mol %.

In the present invention, the proportion of LiI to all the starting materials is preferably 3 mol % or more and 20 mol % or less, more preferably 5 mol % or more and 15 mol % or less.

In the present invention, the proportion of LiBr to all the starting materials is preferably 5 mol % or more and 30 mol % or less, more preferably 10 mol % or more and 20 mol % or less.

In the case where the sulfide solid electrolyte has a composition of $a((1-b)LiI \cdot bLiBr) \cdot (1-a)(cLi_2S \cdot (1-c)P_2S_5)$, a corresponds to the proportion of the total of LiI and LiBr, b corresponds to the proportion of LiBr, and c corresponds to the proportion of $Li_2S$.

The solvent for use in the present invention contains a hydrocarbon and an ether compound. By using an ether compound along with a hydrocarbon as the solvent, the hydrocarbon can be readily removed in drying and the solvent content to be contained in the resultant sulfide solid electrolyte can be thereby reduced.

A hydrocarbon is a solvent containing carbon atoms and hydrogen atoms, and examples of the hydrocarbon include a saturated hydrocarbon, an unsaturated hydrocarbon, an aromatic hydrocarbon, etc.

Examples of the saturated hydrocarbon include hexane, pentane, 2-ethylhexane, heptane, octane, decane, cyclohexane, methylcyclohexane, etc. As commercial products thereof, there are mentioned IP Solvent 1016 (manufactured by Idemitsu Kosan Co., Ltd.), IP Solvent 1620 (manufactured by Idemitsu Kosan Co., Ltd.), etc. One alone or two or more of these may be used either singly or as combined.

Examples of the unsaturated hydrocarbon include hexene, heptene, cyclohexene, etc.

Examples of the aromatic hydrocarbon include toluene, xylene, ethylbenzene, decalin, 1,2,3,4-tetrahydronaphthalene, etc. Commercial products thereof include Ipzol 100 (manufactured by Idemitsu Kosan Co., Ltd.), Ipzol 150 (manufactured by Idemitsu Kosan Co., Ltd.), etc.

One alone or two or more kinds of the above hydrocarbons may be used either singly or as combined.

The hydrocarbon is preferably an aromatic hydrocarbon, and is more preferably an aromatic hydrocarbon represented by the following general formula (1):

Ph-(R)n  (1)

(In the formula, Ph represents an aromatic hydrocarbon group, R represents an alkyl group having 1 to 3 carbon atoms. n indicates an integer selected from 1 to 5.)

As the aromatic hydrocarbon group of the above Ph, there is mentioned a substituted or unsubstituted aromatic hydrocarbon group having a ring carbon number of 6 to 30. Specifically, there are mentioned a phenyl group, a naphthyl group, an anthracenyl group, a naphthacenyl group, etc. Above all, a phenyl group and a naphthacenyl group are preferred. Examples of the substituent include a methyl group, an ethyl group, etc., and above all, a methyl group is preferred.

Examples of the alkyl group having 1 to 3 carbon atoms of the above R include a methyl group, an ethyl group, a n-propyl group, an isopropyl group, etc., and above all, a methyl group and an ethyl group are preferred.

n is an integer selected from 1 to 5, and is preferably 1 or 2.

Examples of the aromatic hydrocarbon represented by the above general formula (1) include toluene, xylene, ethylbenzene, etc., and toluene is preferred.

The water content in the hydrocarbon is, in consideration of reaction with the starting materials and the sulfide solid electrolyte to be produced, preferably 50 ppm (by weight) or less. Water may cause degradation of a sulfide solid electrolyte through reaction and may worsen the properties of the sulfide solid electrolyte. Accordingly, the water content is preferably smaller, and the water content in the hydrocarbon is more preferably 30 ppm or less, even more preferably 20 ppm or less.

The ether compound is not specifically limited and may be any one having an ether group (C—O—C). Above all, the ether compound is preferably one having two hydrocarbon groups bonding to an oxygen element. This is because the compound of the type has low reactivity with the starting materials and the sulfide solid electrolyte to be produced. Also preferably, the carbon number of each hydrocarbon group is 10 or less. This is because when the carbon number is too large, there is a possibility that the ether compound would be difficult to remove by drying. One alone or two or more kinds of the above-mentioned ether compounds may be used either singly or as combined.

The hydrocarbon group may be linear or cyclic, but is preferably linear. The hydrocarbon group is preferably a saturated hydrocarbon group or an aromatic hydrocarbon group. The hydrocarbon group includes an alkyl group such as a methyl group, an ethyl group, a propyl group, an isopropyl group, a butyl group, etc., a cycloalkyl group such as a cyclopentyl group, a cyclohexyl group, etc., an aromatic hydrocarbon group such as a phenyl group, a benzyl group, etc.

The molecular weight of the ether compound is, for example, preferably within a range of 46 to 278, more preferably within a range of 74 to 186.

Specific examples of the ether compound include dimethyl ether, methyl ethyl ether, dipropyl ether, dibutyl ether, cyclopentyl methyl ether, anisole, etc. Dibutyl ether (DBE) is preferred.

The amount of the ether compound to be added is, for example, preferably within a range of 0.01% by weight to 100% by weight relative to the total amount of the starting materials, more preferably within a range of 0.1% by weight to 100% by weight, even more preferably within a range of 1% by weight to 50% by weight. When the amount of the ether compound to be added is 0.01% by weight or more, the solvent removal effect can be exhibited and the solvent content to remain in the resultant sulfide solid electrolyte can be thereby reduced. On the other hand, when the amount of the ether compound to be added is 100% by weight or less, the ether compound is easy to remove.

The blending ratio of the hydrocarbon and the ether compound is, from the viewpoint of exhibiting the advantageous effects of the present invention, preferably from 480/1 to 50/1 by volume ratio, more preferably from 400/1 to 120/1, even more preferably from 240/1 to 150/1.

Any other solvent may be added within a range not detracting the advantageous effects of the present invention. Examples of the other solvent include ketones such as acetone, methyl ethyl ketone, etc., alcohols such as ethanol, butanol, hexanol, 2-methylhexanol, 2-ethyhexnaol, etc., esters such as ethyl acetate, butyl acetate, butyl butyrate, etc., halogenohydrocarbons such as dichloromethane, chlorobenzene, etc.

Though not specifically limited, (the step of) reacting the above-mentioned starting materials, lithium compound, phosphorus compound and halogen compound, in a solvent containing a hydrocarbon and an ether compound preferably includes (a step of) amorphizing the starting materials. Specifically, (a step of) reacting the starting materials in a solvent containing a hydrocarbon and an ether compound, and (a step of) reacting the starting materials in a solvent containing a hydrocarbon and an ether compound while given mechanical force are preferred.

In the above-mentioned steps, examples of the method of reacting the starting materials in a solvent containing a hydrocarbon and an ether compound include a mechanical milling method (hereinafter this may be referred to as MM method), a slurry method, etc.

These methods are described below.

(1) Mechanical Milling Method (MM Method)

MM method is described, for example, in JP-A 11-134937, JP-A 2004-348972, and JP-A 2004-348973.

Specifically, for example, given amounts of starting materials for a sulfide solid electrolyte, such as $Li_2S$, $P_2S_5$, LiI, LiBr and others, are mixed in a mortar, and using the resultant mixture and a solvent containing a hydrocarbon and an ether compound in a ball mill or the like, the materials are reacted for a given period of time to give a sulfide glass.

In the MM method using the above-mentioned starting materials, the materials can be reacted at room temperature (25° C.). Accordingly, the method has an advantage in that the starting materials are not thermally decomposed and a sulfide glass having a charge-in composition can be obtained.

Another advantage of the MM method is that the sulfide glass can be powdered during its production.

For the MM method, various modes of a tumbling ball mill, a rolling ball mill, a shaking ball mill, a planetary ball mill and the like are employable.

Conditions for the MM method are referred to. For example, in the case where a planetary ball milling machine is used, the treatment may be carried out at a rotation speed of tens to hundreds rotations/min for 0.5 hours to 100 hours.

Balls each having a different diameter may be used in the ball mill, as in JP-A 2010-90003. The temperature inside the mill for MM treatment may be controlled as in JP-A 2010-30889. The temperature of the starting materials in MM treatment is preferably 60° C. or higher and 160° C. or lower.

(II) Slurry Method

A slurry method is described in WO2004/093099 and WO2009/047977.

Specifically, for example, given amount of the starting materials for a sulfide solid electrolyte, such as $Li_2S$, $P_2S_5$, LiI, LiBr and others, are reacted for a given period of time in a solvent containing a hydrocarbon and an ether compound to give a sulfide glass.

LiI and LiBr are preferably dissolved in a solvent containing a hydrocarbon and an ether compound, or are preferably in the form of granules.

Here, as described in JP-A 2010-140893, the reaction may be carried out while a slurry that contains starting materials is circulated between a grinder and a reactor for promoting the reaction.

The sulfide glass may also be produced by alternately carrying out a step of reacting starting materials for a sulfide solid electrolyte, such as $Li_2S$, $P_2S_5$, LiI, LiBr and others, in a solvent containing a hydrocarbon and an ether compound while grinding them therein, and a step of reacting starting materials for a sulfide solid electrolyte, such as $Li_2S$, $P_2S_5$, LiI, LiBr and others, in a solvent containing a hydrocarbon and an ether compound.

For example, in a grinder, the above-mentioned starting materials are reacted in a solvent that contains a hydrocarbon and an ether compound, while ground therein, to thereby synthesize a sulfide glass, and separately, the starting materials are reacted in a solvent containing a hydrocarbon and an ether compound in a reactor to synthesize a sulfide glass, and the starting materials during reaction are circulated between the grinder and the reactor.

On the other hand, the starting material, lithium sulfide may be previously ground for effectively carrying out the reaction, as described in WO2009/047977.

The reaction temperature is preferably 20° C. or higher and 80° C. or lower, more preferably 20° C. or higher and 60° C. or lower. The reaction time is preferably 1 hour or more and 16 hours or less, more preferably 2 hours or more and 14 hours or less.

The production conditions including the temperature condition, the treatment time and the charge-in amount for the MM method and the slurry method can be suitably controlled in accordance with the equipment used.

As the amorphization method for the above-mentioned starting materials, the slurry method is preferred from the viewpoint of cost reduction.

After the reaction, it is preferable to remove the solvent containing a hydrocarbon and an ether compound from the reaction product, from the viewpoint of reducing the content of the solvent remaining in the resultant sulfide solid electrolyte.

The method for producing the sulfide solid electrolyte of the present invention must have, after the step of reacting a lithium compound, a phosphorus compound and a halogen compound in a solvent containing a hydrocarbon and an ether compound, (a thermal treatment step) of heating the sulfide glass obtained in the previous step to produce a sulfide glass ceramic.

As a result of thermal treatment of the sulfide glass, a sulfide glass ceramic having a reduced solvent content can be obtained.

The heat treatment temperature in the heat treatment step may be suitably defined in accordance with the kind of the sulfide solid electrolyte to be obtained, and may be a temperature not lower than the crystallization temperature (Tc) of the crystal structure that the sulfide solid electrolyte has, and in general, the temperature is 150° C. or higher. In particular, the heat treatment temperature is preferably 170° C. or higher, more preferably 190° C. or higher. On the other hand, the upper limit of the heat treatment temperature is, though not specifically limited, preferably 300° C. or lower, more preferably 280° C. or lower.

The heat treatment time is not specifically limited so far as it is enough to obtain a desired sulfide glass ceramic. For example, the time is within a range of 1 minute to 24 hours, and in particular, preferably within a range of 1 minute to 10 hours. The heat treatment is carried out in an inert gas atmosphere such as an Ar gas, a nitrogen gas or the like, or in a dry air atmosphere, and in a dew point environment where the dew point is preferably −60° C. or lower, more preferably −75° C. or lower.

Examples of the heat treatment method include, though not specifically limited thereto, a method of using a hot plate, a tube heater, a vacuum drier or the like. Industrially, a horizontal drier, a horizontal shaking fluidized drier or the like equipped with both a heating unit and a conveyor mechanism is also employable.

Heating (heat treatment) of the sulfide glass preferably includes a first heating (first heat treatment) of converting the sulfide glass into a sulfide glass ceramic having a degree of crystallization of 50% or less, and a second heating (second heat treatment) of increasing the degree of crystallization of the sulfide glass ceramic. The lower limit of the degree of crystallization of the sulfide glass ceramic in the first heating is, though not specifically limited thereto, for example, 1% or more.

As a result of the two-stage heat treatment of treating the sulfide glass under the above-mentioned specific conditions, the solvent content in the resultant sulfide glass ceramic can be reduced more.

Here, the degree of crystallization of the sulfide glass ceramic means a proportion of the crystal structure derived from the sulfide solid electrolyte contained in the sulfide glass ceramic. The degree of crystallization can be measured through X-ray diffractometric (XRD) apparatus, and specifically, it can be measured according to the method described in the section of Examples.

The first heating is carried out under such a condition that the degree of crystallization of the sulfide glass ceramic is preferably 50% or less, more preferably 40% or less, even more preferably 38% or less. Though not specifically limited thereto, the lower limit is, for example, 1% or more, preferably 5% or more, more preferably 10% or more. When the degree of crystallization of the sulfide glass ceramic is 50% or less, the sulfide glass ceramic can appropriately crystallize, thereby facilitating removal of the solvent having remained in the sulfide glass ceramic.

The heat treatment temperature in the first heating is not specifically limited so far as the heat treatment is carried out at a temperature at which the degree of crystallization of the sulfide glass ceramic is within the above-mentioned range. For example, the lower limit is preferably 100° C. or more, more preferably 120° C. or more. The upper limit is preferably a temperature not higher than the crystallization temperature (Tc) of the crystal structure that the resultant sulfide glass ceramic has, and is more preferably lower than the crystallization temperature (Tc), even more preferably 140° C. or lower. When the temperature is 100° C. or higher, the solvent having remained in the resultant sulfide glass ceramic can be readily removed, and when the temperature is not higher than the crystallization temperature (Tc), the resultant sulfide glass ceramic can be appropriately crystallized.

Here, the crystallization temperature (Tc) in the present invention is the crystallization temperature of the crystal structure that the sulfide glass ceramic has, that is, the crystallization temperature of the sulfide glass that is obtained using the starting materials necessary for obtaining the sulfide glass ceramic, and can be confirmed and measured through differential thermal analysis (DTA). For example, the temperature that shows an exothermic peak to be detected on the lowest temperature side in differential thermal analysis (DTA) under the condition of a heating rate of 10° C./min using a differential thermal analyzer (DTA apparatus) is the crystallization temperature.

The heat treatment time in the first heating is not specifically limited so far as the time is enough to obtain the desired sulfide glass ceramic but is, for example, preferably 1 minute or more, more preferably 10 minutes or more, even more preferably 30 minutes or more. The upper limit of the heat treatment time is preferably 10 hours or less, more preferably 5 hours or less, even more preferably 4 hours or less, further more preferably 3 hours or less. The heat treatment condition and the heat treatment method are as described above.

The second heating is carried out under such a condition that the degree of crystallization of the sulfide glass ceramic obtained in the first heating is further increased. Specifically, the heating is carried out under such a condition that the degree of crystallization is increased more by preferably at least 10%, more preferably by at least 20% than the degree of crystallization of the sulfide glass ceramic obtained in the first heating.

The heat treatment temperature in the second heating is preferably not lower than the crystallization temperature (Tc) of the crystal structure that the resultant sulfide solid electrolyte has, more specifically, it is preferably 150° C. or higher, more preferably 170° C. or higher, even more preferably 190° C. or higher. The upper limit is preferably 300° C. or lower, more preferably 280° C. or lower.

The heat treatment temperature is preferably the crystallization temperature (Tc)+15° C. or more, and the upper limit is preferably the crystallization temperature (Tc)+60° C. or less, more preferably the crystallization temperature (Tc)+45° C. or less.

Falling within the above range, the resultant sulfide glass ceramic can be sufficiently crystallized and the solvent content in the sulfide glass ceramic may be reduced more.

The heat treatment time in the second heating is not specifically limited so far as the time is enough to obtain the desired sulfide glass ceramic but is, for example, preferably 1 minute or more, more preferably 30 minutes or more. The upper limit of the heat treatment time is preferably 10 hours or less, more preferably 5 hours or less. The heat treatment condition and the heat treatment method are as described above.

As the starting materials and the solvent for use in the sulfide glass ceramic production method, those described hereinabove can be used.

The solvent content in the thus-obtained sulfide glass ceramic (sulfide solid electrolyte) is preferably 2.0% by weight or less relative to the total amount of the sulfide glass ceramic, more preferably 1.0% by weight or less, even more preferably 0.5% by weight or less.

Specifically, the solvent content may be measured according to the method described in the section of Examples.

The sulfide glass ceramic preferably has a high Li ion conductivity, and the Li ion conductivity thereof at room temperature is preferably $3.0 \times 10^{-3}$ S/cm or more, more preferably $4.0 \times 10^{-3}$ S/cm or more, even more preferably $5.0 \times 10^{-3}$ S/cm or more.

Specifically, the Li ion conductivity may be measured according to the method described in the section of Examples.

The molar amount of each element in the sulfide solid electrolyte obtained in the present invention preferably satisfies the following formula.

Preferably, $2.2 \leq (Li/P) \leq 6.5$, more preferably $3.1 \leq (Li/P) \leq 4.0$, even more preferably $3.2 \leq (Li/P) \leq 3.7$.

Preferably, $3.5 \leq (S/P) \leq 4.8$, more preferably $3.8 \leq (S/P) \leq 4.5$, even more preferably $3.9 \leq (S/P) \leq 4.1$.

Preferably, $0.07 \leq (Y/P) \leq 1.9$ (where Y means the total molar amount of iodine element and bromine element), more preferably $0.2 \leq (Y/P) \leq 0.8$, even more preferably $0.3 \leq (Y/P) \leq 0.7$.

The sulfide solid electrolyte to be obtained according to the present invention is preferably composed of an ion conductor having a lithium element (Li), a phosphorus element (P) and a sulfur element (S), and lithium iodide (LiI) and lithium bromide (LiBr).

The ion conductor is not specifically limited so far as it contains a lithium element (Li), a phosphorus element (P), and a sulfur element (S), and above all, one having an ortho composition is preferred. This is because the substance of the type can be a sulfide solid electrolyte having high chemical stability. Here, ortho generally indicates one having a highest hydration degree among oxo-acids that are obtained through hydration of the same oxide. In the present invention, a crystal composition where $Li_2S$ is added most among sulfides is referred to as an ortho composition. For example, in the $Li_2S$—$P_2S_5$ series, $Li_3PS_4$ corresponds to an ortho composition. In the case of the $Li_2S$—$P_2S_5$ series sulfide solid electrolyte, the ratio of $Li_2S$ to $P_2S_5$ obtaining the ortho composition is $Li_2S:P_2S_5=75:25$ on the molar basis.

In the present invention, "having an ortho composition" includes not only a strict ortho composition but also a composition in the vicinity thereof. Specifically, the wording means that the anion structure ($PS_4^{3-}$ structure) of the ortho composition is the main structure. The proportion of the anion structure of the ortho composition is preferably 60 mol % or more relative to the total anion structure in the ion conductor, more preferably 70 mol % or more, even more preferably 80 mol % or more, further more preferably 90 mol % or more. The proportion of the anion structure of the ortho composition may be determined through Raman spectrometry, nuclear magnetic resonance analysis (NMR method), X-ray photoelectron spectrometry (XPS method), etc.

Preferably, the sulfide solid electrolyte to be obtained in the present invention does not substantially contain $Li_2S$. This is because the sulfide solid electrolyte of the type may generate a small amount of hydrogen sulfide. $Li_2S$ reacts with water to generate hydrogen sulfide. For example, when the proportion of $Li_2S$ in all the starting materials is large, $Li_2S$ may remain frequently. "Substantially not containing $Li_2S$" can be confirmed through X-ray diffractometry. Specifically, in the case where the pattern does not have peaks of $Li_2S$ ($2\theta=27.0°$, $31.2°$, $44.8°$, $53.1°$), it can be considered that the substance does not substantially contain $Li_2S$.

Preferably, the sulfide solid electrolyte to be obtained in the present invention does not substantially contain crosslinked sulfur. This is because the sulfide solid electrolyte of the type can be one that generates a small amount of hydrogen sulfide.

"Crosslinked sulfur" is a crosslinked sulfur in a compound produced through reaction of $Li_2S$ and $P_2S_5$. For example, a crosslinked sulfur in a structure of $S_3P$—$S$—$PS_3$ formed through reaction of $Li_2S$ and $P_2S_5$ corresponds to the term. The crosslinked sulfur of the type readily reacts with water to generate hydrogen sulfide. For example, when the proportion of $Li_2S$ in all the starting materials is small, the crosslinked sulfur is easy to form. "Not substantially contain a crosslinked sulfur" can be confirmed through Raman spectrometry. For example, in the case of a $Li_2S$—$P_2S_5$ series sulfide solid electrolyte, the peak of a structure $S_3P$—$S$—$PS_3$ generally appears at 402 $cm^{-1}$. Accordingly, it is preferable that the peak is not detected. The peak of the $PS_4^{3-}$ structure appears generally at 417 $cm^{-1}$. In the present invention, preferably, the intensity $I_{402}$ at 402 $cm^{-1}$ is smaller than the intensity $I_{417}$ at 417 $cm^{-1}$. More specifically, the intensity $I_{402}$ is, for example, preferably 70% or less of the intensity $I_{417}$, more preferably 50% or less, even more preferably 35% or less.

The shape of the sulfide solid electrolyte to be obtained in the present invention is not specifically limited, and examples thereof include a granular shape. The mean particle diameter ($D_{50}$) of the granular sulfide solid electrolyte is, for example, preferably within a range of 0.1 μm to 50 μm. The mean particle diameter ($D_{50}$) is a particle diameter in a particle diameter distribution cumulative curve on which the data are integrated sequentially from that of the smallest particle having a smallest particle diameter and on which the integrated value reached 50% of the total value, and the volume distribution can be measured, for example, using a laser diffraction/scattering particle sizer.

The sulfide solid electrolyte to be obtained in the present invention can be used in any desired applications that need Li ion conductivity. Above all, the sulfide solid electrolyte is preferably used in batteries. The sulfide solid electrolyte may be used either in a positive electrode layer or in a negative electrode layer, and may also be used in an electrolyte layer. Each layer can be produced according to a known method.

The positive electrode layer preferably contains a positive-electrode active material and the sulfide solid electrolyte obtained in the present invention and a conductive assistant. In addition, it may also contain a binder.

The positive-electrode active material may be a substance that enables insertion and removal of lithium ions, and as the material, any one known as a positive-electrode active material in the field of batteries is usable.

For example, there are mentioned oxides such as $V_2O_5$, $LiCoO_2$, $LiNiO_2$, $LiMnO_2$, $LiMn_2O_4$, $Li(Ni_aCo_bMn_c)O_2$ (wherein $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (wherein $0 \leq Y < 1$), $Li(Ni_aCo_bMn_c)O_4$ ($0<a<2$, $0<b<2$, $0<c<2$, $a+b+c=2$), $LiMn_{2-Z}Ni_ZO_4$, $LiMn_{2-Z}Co_ZO_4$ (wherein $0<Z<2$), $LiCoPO_4$, $LiFePO_4$, bismuth oxide ($Bi_2O_3$), bismuth plumbate ($Bi_2Pb_2O_5$), copper oxide (CuO), vanadium oxide ($V_6O_{13}$), $Li_xCoO_2$, $Li_xNiO_2$, $Li_xMn_2O_4$, $Li_xFePO_4$, $Li_xCoPO_4$, $Li_xMn_{1/3}Ni_{1/3}Co_{1/3}O_2$, $Li_xMn_{1.5}Ni_{0.5}O_2$, etc. Regarding other positive-electrode active materials, examples of sulfide-type positive-electrode active materials usable here include elemental sulfur (S), titanium sulfide ($TiS_2$), molybdenum sulfide ($MoS_2$), iron sulfide (FeS, $FeS_2$), copper sulfide (CuS), nickel sulfide ($Ni_3S_2$), lithium sulfide ($Li_2S$), organic disulfide compounds, carbon sulfide compounds, sulfur, etc. Use of S or $Li_2S$ having a high theoretical capacity is preferred.

The conductive assistant may be any one having conductivity, and for example, the conductivity is preferably $1 \times 10^3$ S/cm or more, more preferably $1 \times 10^5$ S/cm or more.

The conductive assistant may be a substance selected from carbon materials, metal powders and metal compounds, or a mixture thereof.

Specific examples of the conductive assistant include substances containing at least one element selected from the group consisting of carbon, nickel, copper, aluminum, indium, silver, cobalt, magnesium, lithium, chromium, gold, ruthenium, platinum, beryllium, iridium, molybdenum, niobium, osmium, rhodium, tungsten and zinc, and these are preferred. A carbon elemental substance having high conductivity, and a metal elemental substance, a mixture or a compound containing carbon, nickel, copper, silver, cobalt, magnesium, lithium, ruthenium, gold, platinum, niobium, osmium or rhodium are more preferred.

Specific examples of the carbon material include carbon black such as Ketjen black, acetylene black, Denka Black, thermal black, channel black, etc., and graphite, carbon fibers, activated carbon, etc. One alone or two or more of these may be used either singly or as combined.

Above all, acetylene black, Denka Black and Ketjen black having high electron conductivity are favorable.

As the binder, fluororesins such as polytetrafluoroethylene (PTFE), polyvinylidene fluoride (PVdF), fluororubber, etc., thermoplastic resins such as polypropylene, polyethylene, etc., ethylene-propylene-diene rubber (EPDM), sulfonated EPDM, natural butyl rubber (NBR) and the like are emplyable, either singly or as a mixture of two or more of them. In addition, an aqueous dispersion of a cellulosic or styrene-butadiene rubber (SBR) that is a water-based binder, or the like is also employable.

In the positive electrode layer, the proportion of the positive-electrode active material, the sulfide solid electrolyte, the conductive assistant and others is not specifically limited, and any known proportion is employable.

The thickness of the positive electrode layer is preferably 0.01 mm or more and 10 mm or less.

The positive electrode layer may be produced in a known method. For example, it can be produced according to a coating method or an electrostatic method (an electrostatic spray method, an electrostatic screen method, etc.).

The negative electrode layer preferably contains a negative-electrode active material, the sulfide solid electrolyte obtained in the present invention and a conductive assistant. The layer may contain a binder.

The negative-electrode active material may be a substance that enables insertion and removal of lithium ions, and as the material, any one known as a negative-electrode active material in the field of batteries is usable.

For example, there are mentioned carbon materials, specifically artificial graphite, graphite carbon fibers, resin-fired carbon, thermo-cracked vapor-phase growth carbon, coke, mesocarbon microbeads (MCMB), furfuryl alcohol resin-fired carbon, polyacene, pitch carbon fibers, vapor-phase growth carbon fibers, natural graphite, hardly-graphitizable carbon, etc. A mixture of these is also employable. Artificial graphite is preferred.

In addition, a metal itself such as a metal lithium, a metal indium, a metal aluminum, a metal silicon or the like, and an alloy of the metal combined with any other element or compound can also be used as a negative-electrode material. Above all, silicon, tin and lithium metals having a high theoretical capacity are preferred.

The conductive assistant and the binder may be the same as those mentioned hereinabove for the positive electrode layer.

The formation method and the thickness of the negative electrode layer are the same as those of the positive electrode layer.

The electrolyte layer contains the sulfide solid electrolyte obtained in the present invention, and may contain a binder, and may further contain any other electrolyte. As the binder, the same as those mentioned hereinabove for the positive electrode layer may be again mentioned.

The other electrolyte includes polymer-type solid electrolytes, oxide-type solid electrolytes, etc.

The polymer-type solid electrolytes are not specifically limited. For example, there are mentioned materials that are usable as a polyelectrolyte, such as fluororesin, polyethylene oxide, polyacrylonitrile, polyacrylate and their derivatives and copolymers, as disclosed in JP-A 2010-262860.

Examples of the fluororesin include those containing vinylidene fluoride (VdF), hexafluoropropylene (HFP), tetrafluoroethylene (TFE) or their derivatives, as the structural unit therein. Specifically, there are mentioned homopolymers such as polyvinylidene fluoride (PVdF), polyhexafluoropropylene (PHFP), polytetrafluoroethylene (PTFE), etc., and binary copolymers and ternary copolymers such as copolymers of VdF and HFP, etc.

As the oxide-type solid electrolyte, LiN, LISICONs, thio-LISICONs, perovskite structure-having crystals such as $La_{0.55}Li_{0.35}TiO_3$, etc., NASICON-type structure-having $LiTi_2P_3O_{12}$, and further electrolytes prepared by crystallizing these and the like are usable.

The electrolyte layer may be produced, for example, by applying a slurry that contains the sulfide solid electrolyte obtained in the present invention, a binder and a solvent, or according to an electrostatic screen printing method using a particulate sulfide solid electrolyte.

The sulfide solid electrolyte in the electrolyte layer is preferably fused. Here, fusing means that a part of sulfide solid electrolyte particles have melted and the melted part has been integrated with other sulfide solid electrolyte particles.

The electrolyte layer may be a tabular body of the sulfide solid electrolyte. The embodiment includes a case where a part or all of the sulfide solid electrolyte particles have melted to form a tabular body.

The thickness of the electrolyte layer is preferably 0.001 mm or more and 1 mm or less.

Preferably, the battery uses a collector in addition to the positive electrode layer, the electrolyte layer and the negative electrode layer. As the collector, any known one is usable. For example, a layer formed by coating a substance reactive with the above-mentioned sulfide solid electrolyte, such as Au, Pt, Al, Ti, Cu or the like, with Au or the like is usable.

EXAMPLES

Next, the present invention is described concretely by means of Examples, but the present invention is not whatsoever restricted by these Examples.

[Measurement of Residual Solvent Amount]

The residual solvent amount was measured using a gas chromatography (GC) apparatus. Regarding the summary of the measurement, a sulfide solid electrolyte decomposed with methanol is analyzed through GC, and each solvent is quantified based on an absolute calibration curve.

0.1 g of a sample is accurately weighed in a vial bottle. 10 ml of methanol is put into the vial bottle so as to completely decompose and dissolve the sample. About 1.5 ml of the dissolved sample is put into a vial bottle for GC, capped and sealed up with a crimper. This is set in a GC autosampler and analyzed. The calibration curve is prepared as follows. 0.5 g of the solvent to be used is weighed, and quantified with 50 ml (corresponding to 10000 µg/ml) of methanol. This is diluted to be 2500, 1000, 250, 25, 2.5 µg/ml (standard liquids), and analyzed through GC. From the peak area and the concentration of the standard liquid, a calibration curve is prepared according to a least-square method. The GC peak area value of the sample liquid is applied to the calibration curve, and according to the following formula, the concentration in the sample liquid is calculated.

Residual solvent amount in sulfide solid electrolyte (wt %)=[concentration obtained from calibration curve (µg/ml)×methanol amount used in sample dissolution (10 ml)]/sample amount (g).

[Measurement of Li Ion Conductivity (σ)]

Sulfide solid electrolytes obtained in Examples and Comparative Examples each was shaped into a sample piece having a cross section of 10 mmϕ (cross-sectional area S=0.785 cm$^2$) and a height (L) of 0.1 to 0.3 cm. Electrode terminals were set at the top and the bottom of the sample piece, and measurement was performed according to an alternate current impedance method (frequency range: 5 MHz to 0.5 Hz, amplitude: 10 mV) to prepare a Cole-Cole plot. The actual number part Z' (Ω) at the point at which −Z" (Ω) is the smallest at around the right end of the arc observed in the high-frequency side region is referred to as a bulk resistance R (Ω) of the electrolyte, and according to the following formula, the Li ion conductivity σ (mS/cm) was calculated.

R=ρ(L/S)

σ=1/ρ

In the present invention, the lead distance was about 60 cm for the measurement.

[Measurement of Degree of Crystallization of Sulfide Glass Ceramic]

The degree of crystallization of the sulfide glass ceramic was measured through X-ray diffractometry (XRD). It was calculated from the ratio of the total area of the peaks in XRD to the crystal area.

Example 1

A production apparatus with, as connected thereto, a stirrer-equipped 1.5-liter glass reactor and a bead mill unit (Starmill Miniature, manufactured by Ashizawa Finetech Ltd., 0.15 L, with 444 g of 0.5-mmφ zirconia balls put therein), in which the following mixture (slurry) could be circulated, was used.

A mixture prepared by adding 1200 ml of dewatered toluene and 7.2 ml of dibutyl ether (DBE) to 29.7 g of lithium sulfide (LiOH content: 0.1% by mass or less), 47.8 g of diphosphorus pentasulfide, 15.4 g of lithium iodide and 15.0 g of lithium bromide was charged in the above-mentioned production apparatus.

Via a pump, the mixture (slurry) charged in the production apparatus was circulated between the reactor and the bead mill unit at a flow rate of 480 ml/min, and the reactor was heated up to 80° C. Hot water was made to run around the bead mill apparatus body in a mode of external circulation so that the liquid temperature therein could be kept at 70° C., and the apparatus was driven under the condition of a peripheral speed of 12 m/s. At every 2 hours, the slurry was sampled, and analyzed through powder X-ray diffractometry using an X-ray diffraction (XRD) unit (SmartLab, manufactured by Rigaku Corporation), and the remaining amount of the starting materials was confirmed. The result of XRD analysis confirmed disappearance of the XRD peaks of the starting materials and production of a sulfide glass, and after 48 hours, driving the apparatus was terminated.

The resultant slurry was put into a metal vat in a glove box (dew point: −75° C., in Ar atmosphere). After powder precipitation, the supernatant solvent was removed, and substantial disappearance of the solvent was confirmed visually. The resultant precipitate was dried on a hot plate at 80° C. to give a powdery sulfide glass. The resultant powder sulfide glass was sampled, and the residual solvent amount therein was measured through gas chromatography. As a result, the toluene content relative to the total amount of the sulfide glass was 1.43% by weight, the DBE content was 1.91% by weight, and the total content of toluene and DBE was 3.34% by weight.

Next, the resultant powdery sulfide glass was heated at 185° C. for 3 hours, using a hot plate arranged in a glove box (dew point: −75° C., in Ar atmosphere). XRD analysis after the heating confirmed formation of a sulfide glass ceramic. The resultant sulfide glass ceramic was sampled and the residual solvent amount therein was measured. As a result, the toluene content relative to the total amount of the sulfide glass ceramic was 0.54% by weight, the DBE content was 0.77% by weight, and the total content of toluene and DBE was 1.31% by weight. The Li ion conductivity of the sulfide glass ceramic was measured, and was 4.29 mS/cm.

Example 2

A powdery sulfide glass was obtained in the same manner as in Example 1. The resultant powdery sulfide glass was sampled, and the residual solvent amount therein was measured. As a result, the toluene content relative to the total amount of the sulfide glass was 1.43% by weight, the DBE content was 1.91% by weight, and the total content of toluene and DBE was 3.34% by weight.

Next, a sulfide glass ceramic was produced in the same manner as in Example 1 except that the resultant powdery sulfide glass was heated at 130° C. for 1 hour, using a hot plate arranged in a glove box (dew point: −75° C., in Ar atmosphere) (first heating), and then heated at 195° C. for 3 hours (second heating).

XRD analysis of the heat-treated product after the first heating confirmed formation of a sulfide glass ceramic having a degree of crystallization of 32%. The resultant sulfide glass ceramic was sampled and the residual solvent amount therein was measured. As a result, the toluene content relative to the total amount of the sulfide glass ceramic was 0.43% by weight, the DBE content was 1.29% by weight, and the total content of toluene and DBE was 1.72% by weight.

XRD analysis of the sulfide glass ceramic after the second heating confirmed formation of a sulfide glass ceramic having a degree of crystallization of 59%, that is, the degree of crystallization of the sulfide glass ceramic increased. The resultant sulfide glass ceramic was sampled and the residual solvent amount therein was measured. As a result, the toluene content relative to the total amount of the sulfide glass ceramic was less than 0.10% by weight, the DBE content was 0.16% by weight, and the total content of toluene and DBE was 0.16% by weight. The Li ion conductivity of the sulfide glass ceramic was measured, and was 5.18 mS/cm.

Comparative Example 1

A powdery sulfide glass was obtained in the same manner as in Example 1 except that DBE was not added. The resultant powdery sulfide glass was sampled, and the residual solvent amount therein was measured. As a result, the toluene content relative to the total amount of the sulfide glass was 2.32% by weight.

Next, a sulfide glass ceramic was produced in the same manner as in Example 1 except that the resultant powdery sulfide glass was heated at 203° C. for 3 hours. XRD analysis after the heating confirmed formation of a sulfide glass ceramic. The resultant sulfide glass ceramic was sampled and the residual solvent amount therein was measured. As a result, the toluene content relative to the total amount of the sulfide glass ceramic was 2.20% by weight. The Li ion conductivity of the sulfide glass ceramic was measured, and was 4.87 mS/cm.

Comparative Example 2

A powdery sulfide glass was obtained in the same manner as in Example 2 except that DBE was not added. The resultant powdery sulfide glass was sampled, and the residual solvent amount therein was measured. As a result, the toluene content relative to the total amount of the sulfide glass was 2.32% by weight.

Next, a sulfide glass ceramic was produced in the same manner as in Example 2 except that the resultant powdery sulfide glass was heated at 130° C. for 1 hour (first heating), and then heated at 203° C. for 3 hours (second heating). XRD analysis of the heat-treated product after the first heat treatment confirmed formation of a sulfide glass ceramic. The resultant sulfide glass ceramic was sampled and the residual solvent amount therein was measured. As a result, the toluene content relative to the total amount of the sulfide glass ceramic was 2.26% by weight.

The sulfide glass ceramic after the second heat treatment was sampled, and the residual solvent amount therein was measured. As a result, the toluene content relative to the total amount of the sulfide glass ceramic was 2.06% by weight. The Li ion conductivity of the sulfide glass ceramic was measured, and was 4.85 mS/cm.

As described above, the solvent content in the sulfide glass ceramic obtained in Example 1 where a solvent containing a hydrocarbon and an ether compound was used lowered as compared with that in Comparative Example 1 where a hydrocarbon was used alone as a solvent. By heat-treating the sulfide glass under a specific condition in two stages, the solvent content in the resultant sulfide glass ceramic further reduced (Example 2).

INDUSTRIAL APPLICABILITY

The sulfide solid electrolyte obtained in the present invention has a small solvent content and has a high Li ion conductivity, and is therefore favorable as a constituent material for batteries such as a solid electrolyte layer, etc.

The invention claimed is:

1. A method for producing a sulfide glass ceramic, comprising:
reacting a lithium compound, a phosphorus compound and a halogen compound in a solvent that contains a hydrocarbon and an ether compound to produce a sulfide glass that contains a Li element, a P element, a S element and one or more halogen elements, wherein the blending ratio of the hydrocarbon to the ether compound is from 480/1 to 50/1 by volume ratio and heating the sulfide glass to produce a sulfide glass ceramic.

2. The method for producing a sulfide glass ceramic according to claim 1, wherein the lithium compound is lithium sulfide.

3. The method for producing a sulfide glass ceramic according to claim 1, wherein the phosphorus compound is diphosphorus pentasulfide.

4. The method for producing a sulfide glass ceramic according to claim 3, wherein the proportion of the lithium sulfide to the total of the lithium sulfide and the diphosphorus pentasufide is from 68 mol % to 82 mol %.

5. The method for producing a sulfide glass ceramic according to claim 1, wherein the halogen compound is at least one of lithium iodide and lithium bromide.

6. The method for producing a sulfide glass ceramic according to claim 5, wherein, when lithium iodide and lithium bromide are the starting materials, the proportion of the lithium bromide to the total of the lithium iodide and the lithium bromide is from 1 mol % to 99 mol %.

7. The method for producing a sulfide glass ceramic according to claim 1, wherein the heating includes a first heating of heating the sulfide glass at a temperature of 100° C. or higher and lower than the crystallization temperature (Tc) of the crystalline structure that the sulfide glass ceramic to be obtained has, and after the first heating, a second heating of further heating the sulfide glass ceramic at a temperature of not lower than crystallization temperature (Tc) and up to the crystallization temperature (Tc)+60° C.

8. The method for producing a sulfide glass ceramic according to claim 7, wherein the heat treatment time in the first heating is 1 minute or more and 10 hours or less, and the heat treatment time in the second heating is 1 minute or more and 10 hours or less.

9. The method for producing a sulfide glass ceramic according to claim 7, wherein the heat treatment time in the first heating is 30 minutes or more and 10 hours or less, and the heat treatment time in the second heating is 30 minutes or more and 10 hours or less.

10. The method for producing a sulfide glass ceramic according to claim 7, wherein the first heating is carried out under such a condition that the sulfide glass becomes a sulfide glass ceramic having a degree of crystallization of 1% or more and 50% or less, and the second heating is carried out under such a condition that the degree of crystallization of the sulfide glass ceramic obtained in the first heating is further increased.

11. The method for producing a sulfide glass ceramic according claim 1, wherein the heating includes a first heating of heating the sulfide glass at a temperature of 100° C. or higher and 140° C. or lower, and after the first heating, a second heating of further heating at a temperature of 150° C. or higher and 300° C. or lower.

12. The method for producing a sulfide glass ceramic according to claim 11, wherein the first heating is at a temperature of 120° C. or higher and 140° C. or lower, and the second heating is at a temperature of 170° C. or higher and 280° C. or lower.

13. The method for producing a sulfide glass ceramic according to claim 1, wherein the hydrocarbon is an aromatic hydrocarbon.

14. The method for producing a sulfide glass ceramic according to claim 13, wherein the aromatic hydrocarbon is toluene.

15. The method for producing a sulfide glass ceramic according to claim 1, wherein the ether compound is a linear ether.

16. The method for producing a sulfide glass ceramic according to claim 15, wherein the linear ether is dibutyl ether.

17. The method for producing a sulfide glass ceramic according to claim 1, wherein the amount of the ether compound is from 0.01% by weight to 100% by weight relative to the total amount of the starting materials.

18. The method for producing a sulfide glass ceramic according to claim 1, wherein the blending ratio of the hydrocarbon to the ether compound is from 400/1 to 120/1 by volume ratio.

19. The method for producing a sulfide glass ceramic according to claim 1, wherein the blending ratio of the hydrocarbon to the ether compound is from 240/1 to 150/1 by volume ratio.

20. A method for producing a sulfide solid electrolyte that contains a Li element, a P element, a S element and one or more halogen elements, the method comprising reacting a lithium compound, a phosphorus compound and a halogen compound in a solvent that contains a hydrocarbon and an ether compound, wherein the blending ratio of the hydrocarbon to the ether compound is from 480/1 to 50/1 by volume ratio.

* * * * *